C. G. CAPWELL.
UNIVERSAL JOINT.
APPLICATION FILED OCT. 11, 1913.

1,142,489.

Patented June 8, 1915.

Witnesses:
N. C. Lombard
M. C. Smith

Inventor:
Courtland G. Capwell,
by Walter E. Lombard,
Atty.

UNITED STATES PATENT OFFICE.

COURTLAND G. CAPWELL, OF ROSLINDALE, MASSACHUSETTS.

UNIVERSAL JOINT.

1,142,489. Specification of Letters Patent. Patented June 8, 1915.

Application filed October 11, 1913. Serial No. 794,751.

*To all whom it may concern:*

Be it known that I, COURTLAND G. CAPWELL, a citizen of the United States of America, and a resident of Roslindale, in the county of Suffolk and State of Massachusetts, have invented certain new and useful Improvements in Universal Joints, of which the following is a specification.

This invention relates to universal joints and has for its object the production of a device of this class in which one member will have absolutely free movement into various angles relative to the other member without lost motion while permitting said member to be rotated by the revolution of the other member.

The invention consists in certain novel features of construction and arrangement of parts which will be fully understood by reference to the description of the drawings and to the claims hereinafter given.

Figure 1:
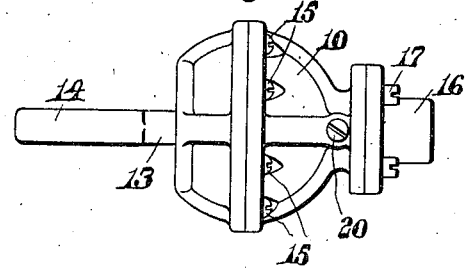
Figure 2:
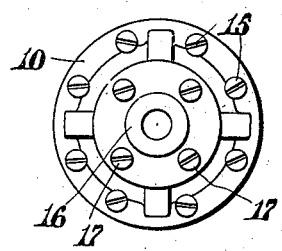
Figure 3:
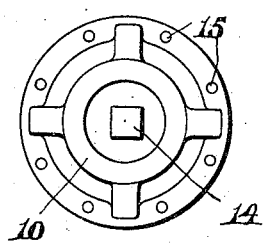
Figure 4:
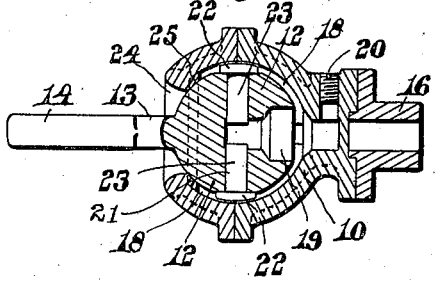
Figure 6:
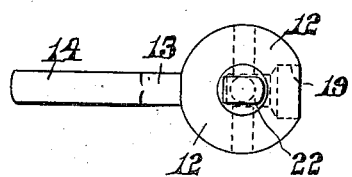
Figure 5:
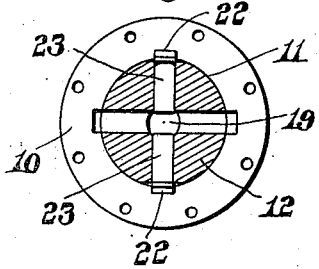

Of the drawings: Figure 1 represents a side elevation of a device embodying the features of the present invention. Fig. 2 represents a right end elevation of the same. Fig. 3 represents a left end elevation of the same. Fig. 4 represents a longitudinal section of the same. Fig. 5 represents a transverse section of the same, and Fig. 6 represents an elevation of the inner member.

Similar characters designate like parts throughout the several figures of the drawings.

In the drawings, 10 is a casing member provided with a spherical chamber 11 in which is fitted a ball member 12 provided with a stem 13 made integral therewith or secured thereto. The stem 13 is preferably squared as at 14 to be connected to some member it is desired to rotate. The casing member 10 is preferably made in two parts which are secured together by means of the screws 15. This casing member 10 has also a hub 16 secured thereto by means of the screws 17. The hub 16 is adapted to be connected to any revoluble driving member. The wall of the chamber 11 is provided with grooves 18 diametrically disposed in the same plane with the axis of the hub 16. In the end of the ball 12 is a cavity 19 adapted to be filled with oil or grease through an opening in the casing member 10, said opening being normally closed by the threaded plug 20. The grooves 18 communicate with the chamber 19 and permit the grease or oil to flow therein. The ball 12 is also provided with a diametrical opening 21 which opening communicates with the chamber 19. At the outer ends of the opening 21 the ball 12 is provided with flat faces against which bear the flat parallel sided heads 22 of revoluble pins 23 positioned in the diametrical hole 21. The flat sided heads 22 of the pins 23 extend beyond the surface of the ball 12 and said pins are fitted to move in the grooves 18, all as clearly indicated in the drawing. The casing member 10 is provided with an enlarged opening 24 through which the stem 13 extends, this opening being of sufficient diameter to permit the ball to move about its center into various angles relative to the casing member 10. A packing 25 is provided around the opening 24 bearing upon the surface of the ball 12 and preventing the oil or grease within the grooves 18 from leaking out.

It is obvious that when the hub 16 is revolved about its axis a rotation will be imparted to the stem 13 in whatever angle it may be relative to said casing member, and this angle may be changed during such rotation without any lost motion, the flat sided heads 22 moving freely in the grooves 18 and the ball 12 moving about the cylindrical pins 23. This makes a very simple construction of universal joint, in which the parts are reduced to a minimum and in which the stem 13 may be moved about the center of the ball 12 and into various angles relative to the casing member 10 without the lost motion which is usual in universal joints now in use. It also provides means for freely lubricating the various moving parts.

It is believed that the operation and many advantages of this invention will be thoroughly understood from the foregoing description.

Having thus described my invention, I claim:

1. In a device of the class described, the combination of a revoluble casing member provided with a spherical chamber having two grooves in its wall in the same plane with the axis of said casing member and having an axial lubricant receiving chamber; a revoluble ball fitted to said chamber having a diametral cylindrical opening therethrough communicating with a lubricant receiving cavity therein said cavity communicating with said lubricant receiving chamber; a packing ring interposed between said wall and revoluble ball, and a pin in each end of said opening having a flat-sided head positioned in one of said grooves.

2. In a device of the class described, the combination of a revoluble casing member provided with a lubricant receiving chamber and with a spherical chamber having two grooves in its wall; a revoluble member having a ball fitted to said chamber provided with two flattened diametrically opposed surfaces between which is positioned a diametral cylindrical opening perpendicular to the axis of said stem, said opening communicating with an open-ended lubricant receiving cavity therein, the open end of which communicates with said lubricant receiving chamber; pins in opposite ends of said opening having flat parallel sided heads provided with flat bearing surfaces abutting said flat surfaces on said ball; and a packing ring interposed between the inner wall of said casing member and revoluble member.

3. In a device of the class described, the combination of a revoluble casing member provided with a spherical chamber having four grooves in its wall parallel with the axis thereof, said casing member having a lubricant receiving chamber with which all of said grooves communicate; a revoluble member having a ball fitted to said chamber, said ball being provided with a lubricant receiving cavity communicating with said lubricant receiving chamber and having two diametrical cylindrical openings perpendicular to the axis of said ball and to each other, the outer ends of said openings communicating with said grooves; and pins in the opposite ends of one of said openings, each pin having a flat-sided head integral therewith positioned in one of said grooves.

Signed by me at 4 Post Office Sq., Boston, Mass., this 2nd day of October, 1913.

COURTLAND G. CAPWELL.

Witnesses:
 EDWARD F. ALLEN,
 MARY C. SMITH.